United States Patent

Nagawa

[15] 3,642,404
[45] Feb. 15, 1972

[54] INJECTION-MOLDING MACHINE

[72] Inventor: Keizo Nagawa, Nagoya-shi, Japan
[73] Assignee: Kabushiki Kaisha Meiki Seisakusho, Nagoya, Japan
[22] Filed: Nov. 14, 1969
[21] Appl. No.: 876,858

[30] Foreign Application Priority Data
Nov. 21, 1968 Japan....................................43/86012

[52] U.S. Cl..............................425/145, 425/166, 425/242
[51] Int. Cl.............................................................B29c 3/06
[58] Field of Search............18/30 CM, 30 CK, 30 CR, 30 CS, 18/30 CV, 16 C

[56] References Cited

UNITED STATES PATENTS

| | | | |
|---|---|---|---|
| 2,671,246 | 3/1954 | Lester | 18/30 CV |
| 2,671,247 | 3/1954 | Lester | 18/30 CV |
| 2,983,956 | 5/1961 | Vogel et al. | 18/30 CR |

Primary Examiner—H. A. Kilby, Jr.
Attorney—Karl F. Ross

[57] ABSTRACT

An injection molding machine provided with a sensing device for sensing the instant mold becomes filled completely with a molten material. Such time of mold filling is sensed either through a sudden or steep increase in the oil pressure of a hydraulic cylinder which receives a ram connected to a screw plunger for forcing a molten plasticized material into the mold cavity or through a sudden increase in the pressure of the molten material in the vicinity of the injection gate. Such increase in oil pressure or melt pressure is sensed in the form of a time derivative or of a rate of change of injection or oil pressure with respect to time, viz, a differential $dP/dT$ in which $P$ stands for injection pressure or back oil pressure and $T$ stands for the time of injection; the derivative is converted into a signal, which acts for triggering certain operating members of the machine for operating in response to the time of mold filling.

13 Claims, 4 Drawing Figures

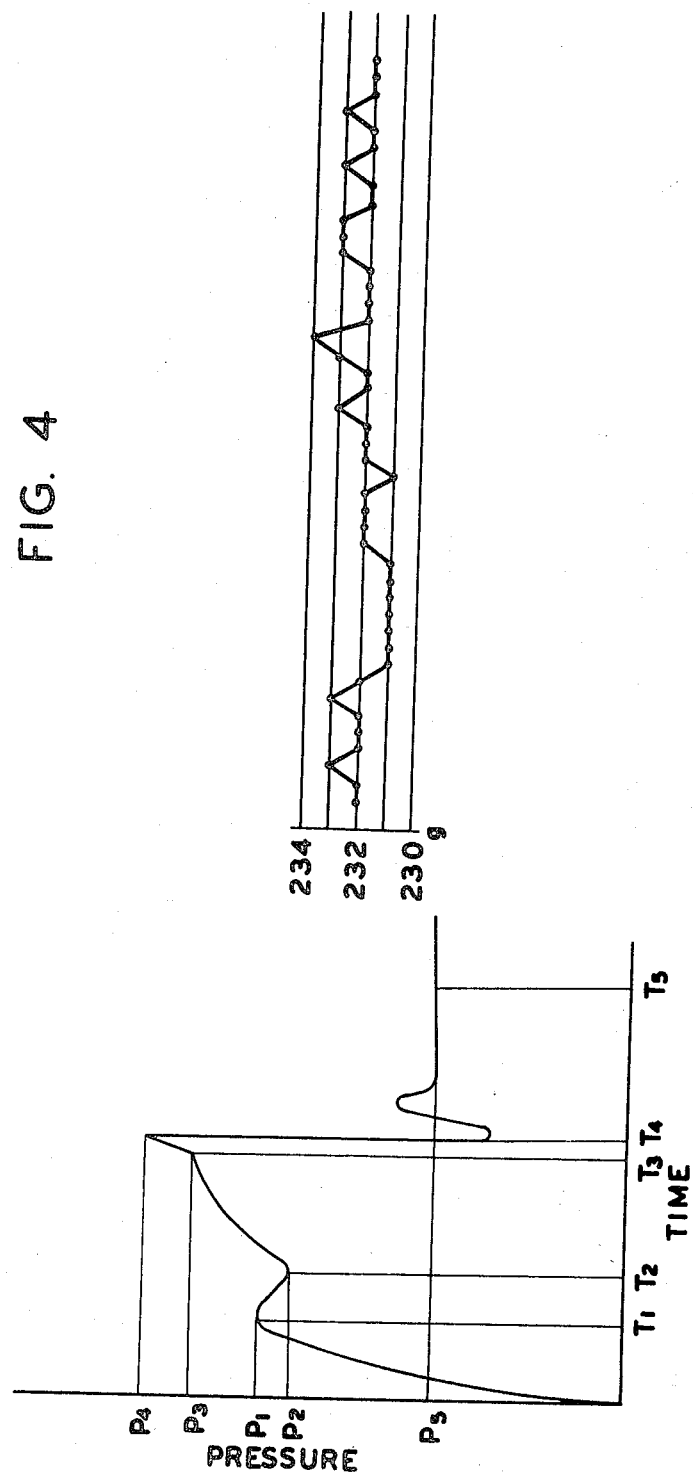

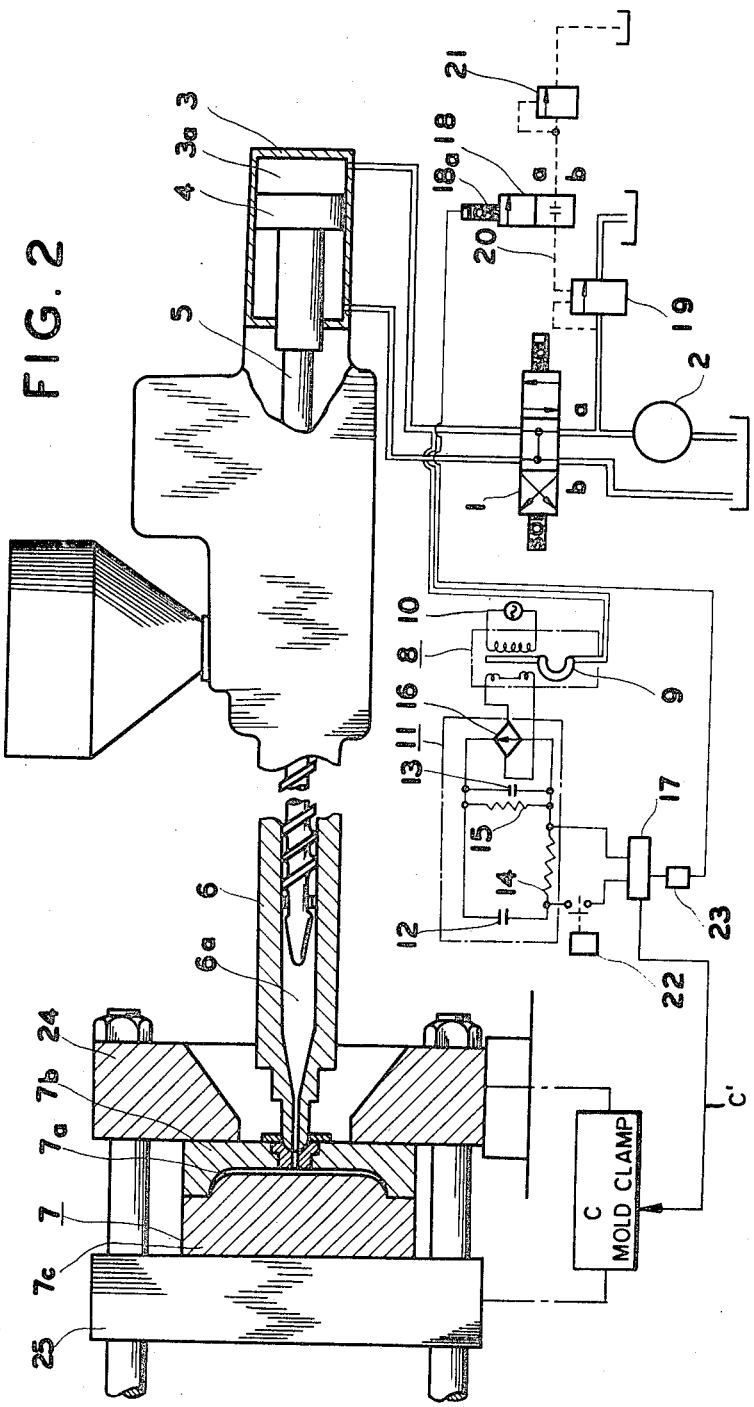

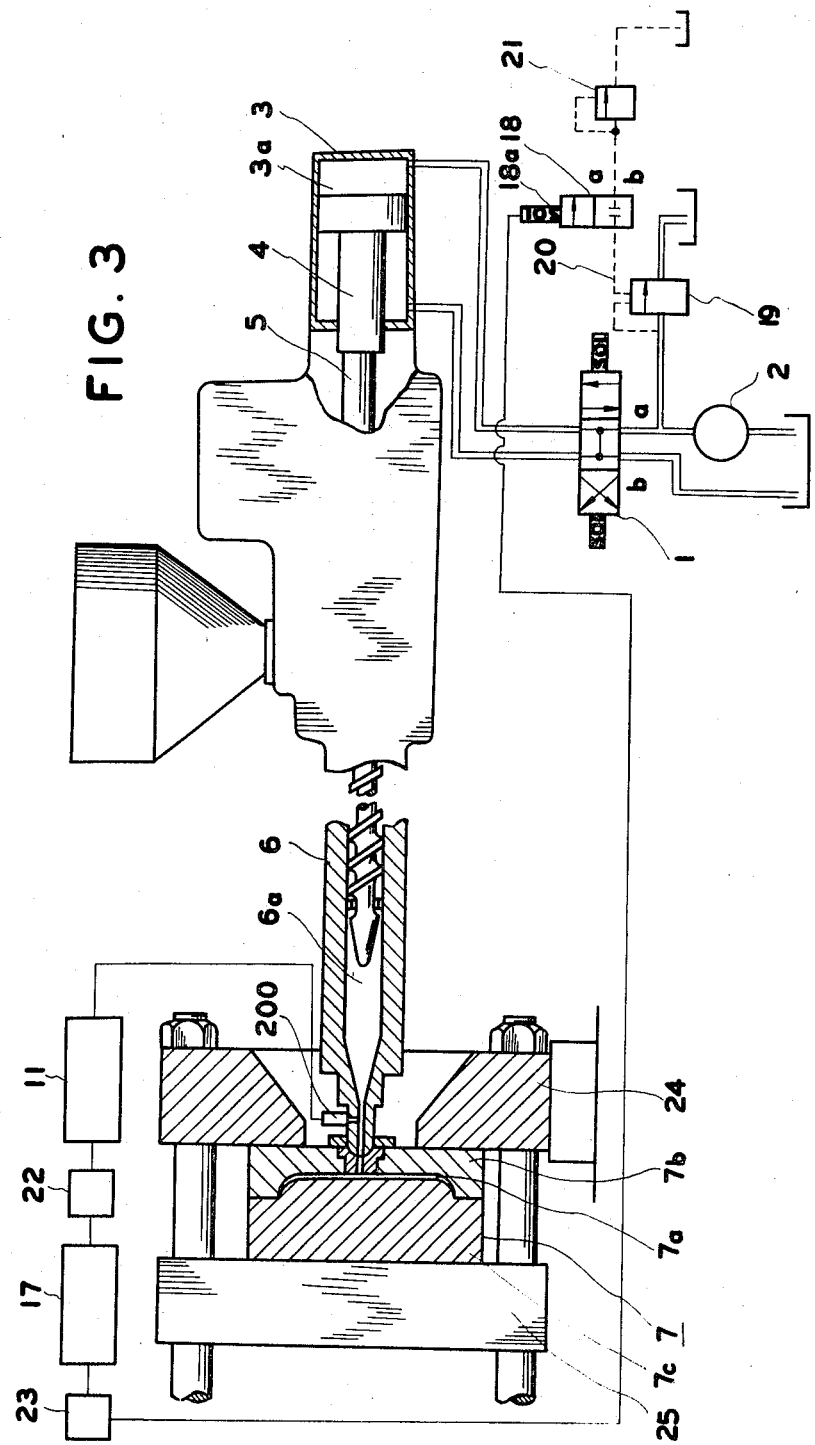

INJECTION-MOLDING MACHINE

FIELD OF THE INVENTION

This invention relates to an injection molding machine, and, more particularly, to an injection molding machine provided with a novel device for positively sensing the instant (time) of completion of mold filling, hereinafter termed the "mold-filling instant" or "mold-filling time".

BACKGROUND OF THE INVENTION

Various sensing devices have so far been used with injection molding machines for sensing the time of mold fullness (mold filling instant) with a view to obtaining a product free from residual strain and having a uniform and homogeneous quality. For sensing the time of mold fullness (mold filling instant) it is known to provide one of the metal molds with a throughgoing hole which receives a slider pin which may be shifted out of the hole as the mold cavity is filled with the material. This known solution is, however, unsatisfactory since the molded product is scored by the head of the slider pin and the construction of the mold is complicated.

It has been proposed to carry out a number of trial molding operations in search of an optimum value of the plunger forward stroke or injection pressure or the pressure working on the molten material, said value corresponding to the "shot size" of the material to be injected into the mold. Such means, however, respond to the temperature fluctuation of molten material. To wit, the viscosity of molten material decreases and the fluidity thereof increases with more rising, temperature and vice versa. The back flow of molten material between the inner surface of heating barrel and flight of screw increases more during the advance of the screw plunger. When the temperature is raised above that on trial operation, the screw plunger stroke must be made longer and the injection pressure decreased.

Hence, it is generally a matter of utmost difficulty to make the necessary corrections for the occasional changes in the mold temperature caused by the changes in the ambient atmospheric temperature or pressure or various other factors. Thus, when the material is viscid, by reason of the lowered mold or cylinder temperature, the cavity of the molds is only partially filled with the material. Conversely when the cylinder and/or mold temperature and hence the fluidity of the material in the cylinder and mold is increased, occasionally the cavity of molds is supplied with excessive molten material.

In the injection molding operation, the changes in the forward velocity of the hydraulically operated screw plunger are closely correlated with the filling of the metal mold with the molten plasticized material. I have investigated these principles in an effort to discover whether the time rate of the change of the forward velocity of the screw plunger may be used as a variable for the operation of sensing the time of mold fullness. However, the result of such research was unsatisfactory as the forward velocity of the screw plunger varied within a narrow ramp and could not be used as the variable for carrying the sensing operation into effect.

OBJECTS OF THE INVENTION

It is thus the main object of the present invention to provide a novel injection molding machine wherein the time of mold fullness may be sensed either directly through the increased injection pressure acting on the molten plasticized material in the vicinity of the sprue passage of the mold, or indirectly through the increased oil pressure acting in a hydraulic cylinder which receives snugly a movable ram connected to a screw plunger adapted for forwarding the material into the mold.

SUMMARY OF THE INVENTION

According to the present invention, the increased injection pressure or increased oil pressure is used for sensing the time of mold fullness (mold-filling instant) in the form of a time derivative or rate of change of injection or oil pressure, or the differential $dP/dT$, wherein $P$ stands for injection pressure or oil pressure, and $T$ the time of injection.

It is another feature of the present invention to provide an injection molding machine that the time of mold fullness (mold-filling instant) is positively sensed, and by a signal produced upon the completion of filling of the mold cavity, the material injected into the mold may be subjected to, by a switchover action, a lower operating pressure, i.e., holding pressure, than the initial higher operating pressure.

A further object of the present invention is to provide an injection molding machine wherein the compression of the material in the mold cavity or residual strain may be prevented by virtue of the holding pressure during hardening of the material in the mold.

A still further object of the present invention is to provide an injection molding machine wherein a material metering device may be dispensed with.

A still further object of the present invention is to provide an injection molding machine wherein the mold-clamping pressure may be reduced.

DESCRIPTION OF THE DRAWING

In the drawing:

FIG. 1 is a chart showing the change of the pressure acting on the present injection molding machine with the lapse of injection time;

FIG. 2 is a side elevation, shown partly in section, and showing the substantial parts of an injection molding machine as well as the inventive device for sensing the time of mold fullness (mold-filling instant) provided for the injection molding machine;

FIG. 3 is a view similar to FIG. 2 and showing a modified embodiment of the present invention; and FIG. 4 shows a table showing the average weights of the molded products sampled from 45 test groups.

SPECIFIC DESCRIPTION

Referring now to FIG. 2, a screw plunger 5 is connected at the right in FIG. 2 to a ram 4 housed in a hydraulic cylinder 3 which in turn is fixedly mounted on the frame of the machine, not shown. There is also provided an oil pump 2 by means of which the oil under pressure may be supplied from a tank to the right-hand chamber 3a of cylinder 3 by way of a conventional four-port directional control valve 1 so as to push the ram towards the left in FIG. 2. There is shown in FIG. 2 a cylinder or barrel 6 for said screw plunger 5 mounted in known manner on the machine frame, not shown. The material supplied from a feed hopper into the space between the screw plunger 5 and the inner wall of the barrel 6 is kneaded and plasticized by the rotating screw 5 and advanced into a cylindrical space 6a ahead of the screw plunger 5, and thence into a mold cavity 7a by way of a nozzle. Preferably, the barrel 6 is provided with wound electric resistance band heaters and a passage for a circulation of the cooling medium so as to maintain the material at the desired degree of plasticity. A hydraulic motor, not shown, is fitted on the machine frame for rotating the screw plunger 5 through a conventional speed-reducing device, not shown. Thus, the screw plunger 5 is both rotatable and reciprocable.

A stationary mold 7b is fixed on a stationary platen 24 which in turn is mounted fixedly on the machine frame. A movable mold 7c is mounted on a movable platen 25, the latter being slidably guided on ways, not shown, of the machine frame and reciprocated back and forth by means of hydraulically actuated unit identified at C and constituting a device for opening and clamping the molds. As an alternative, a series of circularly arranged movable molds may be fixed on a rotary table which is rotatably mounted on the machine frame. The rotary table may be rotated on the machine frame so as to bring movable molds into engagement with the stationary mold sequentially in a manner known per se.

At the start of the injection molding operation, the screw plunger 5 is kept in rotation in the bore of the barrel 6, for kneading and plasticizing the raw material supplied from the feed hopper. As the four-port directional control valve 1 is now at the position shown at $a$ in FIG. 2, the pressure oil is supplied from the pump 2 to the chamber $3a$ of cylinder 3, so that the ram 4 is caused to move to the left in FIG. 2 together with the screw plunger 5 for forcing the material stored in the space $6a$ of the barrel 6 towards the mold cavity $7a$. At the moment when the screw plunger 5 and ram 4 are going to forward, only the force which overcomes static friction need be applied. Since at the earlier period when the molten material is injected into the mold cavity, the cavity and gate are cool, the fluidity of material decreases. As a result, there is caused an increase in the oil pressure (because of increased resistance to flow) in the chamber $3a$ of cylinder 3 until a peak $P_1$ of the oil pressure is attained at time $T_1$ in FIG. 1. When the material starts to flow into the mold cavity $7a$, the oil pressure in the chamber $3a$ decreases temporarily, as indicated at $P_2$ at time $T_2$ in FIG. 1.

When the amount of the molten material which is enough to fill the mold cavity is injected into it, the effort to increase any more molten material increases the oil pressure abruptly, as shown at $P_3$ in FIG. 1, until a peak value $P_4$ is attained at $T_4$, when the mold cavity $7a$ is filled to capacity with the material and the forward movement of the material in the barrel 6 is retarded. This sudden rise in the oil pressure in the chamber $3a$ is sensed by a oil pressure sensing device generally shown at 8 in FIG. 2 in a manner to be more fully described hereinafter. It is to be noted that the latter may be set into actuation only on such an occasion that the oil pressure has been increased abruptly as denoted by a sharp or steep rise from $P_3$ to $P_4$ in FIG. 1, with a view to prevent the untimely actuation of the device 8 caused by the occasional pressure fluctuations in the cylinder 3.

The oil pressure sensing device 8 comprises a generally U-shaped flexible tube 9 known as a Bourdon tube and a linear variable differential transformer, LVDT, 10, the secondary winding of which is connected to a conventional differentiation circuit at 11 comprising a pair of condensers 12, 13 and a pair of variable resistances 14, 15. The sudden increase in the oil pressure in chamber $3a$ causes the free end of the Bourdon tube to be deflected, so that the iron core of the LVDT 10 is caused to be deflected and, as a result, current is produced in the secondary winding of LVDT 10. The current thus produced is applied to the circuit 11 through a rectifier 16 and the output signal from the circuit is given in the form of a time derivative or rate of change of oil pressure in the chamber $3a$. The amplifier 17 inserted in the output of circuit 11 is fed with the aforesaid current signal.

The output signal from the circuit 11 is fed to a relay switch, not shown, in the amplifier 17, connected to the output side of circuit 11. Where the said output signal is equal to or in excess of the rated value of the relay switch, the latter is closed, thus making a circuit from the circuit 11 to the solenoid $18a$ associated with the two-way direction control valve 18 and energizing the solenoid $18a$, whereupon the valve 18 is set for bypassing the oil from the reservoir to an oil sump through a branch line 20 and relief valve means 19 and 21. As a result, the oil pressure in the chamber $3a$ is suddenly decreased to a low working pressure necessary to prevent the plasticized material in the mold cavity from reversing towards the cylinder space $6a$. A conventional smoothing condenser 13 inserted into and forming part of the circuit 11 serves for smoothing the otherwise pulsating current supplied from the secondary side of transformer 10 and preventing the untimely actuation of the relay switch in the amplifier 17. A conventional time delay relay 22 connected to the input of the amplifier 17 is so designed and arranged that the actuation of the latter may be retarded at the aforementioned peak value $P_3$ of the oil pressure in chamber $3a$. The operation of a second time delay 23 connected to the output side of the amplifier is similar to the relay 22 and such that the delivery of the electric signals from the amplifier 17 to the solenoid $18a$ may be brought about after a certain delay. As a result, molten material is packed into the mold cavity and products of high density is produced. In this way, the solenoid $18a$ may be energized only at such time that the mold cavity $7a$ has been completely filled with the plasticized material.

In FIG. 3, a somewhat modified form for the execution of this invention is illustrated. In this modification, a transducer 200 is fitted to the nozzle of the barrel 6 in place of the oil pressure sensing device shown at 8 in FIG. 2. In the modified embodiment as shown in FIG. 3, the equivalent parts are denoted by the same reference numerals.

The operation of the second embodiment is such that a sudden increase in the injection pressure at the nozzle of the barrel 6 is sensed and converted into an electric signal by means of the transducer 200, such electric signal being transmitted to the solenoid $18a$ of the two-way directional control valve 18 through the differentiation circuit generally shown at 11, condenser 22, an amplifier 17 and a second condenser 23 for energizing said solenoid $18a$ and setting the valve 18 for bypassing the pressure oil in the manner as already described with reference to FIG. 2.

SPECIFIC EXAMPLE

FIG. 4 shows the results of the experiment on the fruit saucers of 300 mm. in diameter and 710 cm.² in area, which were obtained by injection molding operation by using the apparatus as shown in FIG. 2. The material metering device was not used with the present apparatus.

In carrying out the present experiment, the following details of the injection molding machine were adopted:

| | |
|---|---|
| Screw diameter | 45 mm. |
| Injection pressure | 1,680 kg./cm.² |
| Mold clamping pressure | 120 t. |

The molding conditions were as follows:

| | |
|---|---|
| Temperature profile of heating barrel | |
| | 200° C. (front) |
| | 180° C. (center) |
| | 160° C. (rear) |
| Screw forward velocity at injection | 4.7 m./min. |
| Rated pressure of relief valve 19 | 100 kg./cm.² |
| Rated pressure of relief valve 21 | 10 kg./cm.² |

The rating of several components of the differentiation circuit were as follows:

| | |
|---|---|
| Capacity of condenser 13 | 0.2 μf. |
| Capacity of condenser 12 | 1 μf. |
| Ohmic resistance of resistor 15 | 80 kΩ |
| Ohmic resistance of resistor 14 | 600 Ω |

The molded products obtained by the apparatus were grouped in 45 test groups or lots and the several products were weighed.

In FIG. 4, the average weights of the molded groups are shown in grams according to the test groups they belonged. As will be realized readily from FIG. 4, the deviation of the weights of these molded products from the mean value of 232 g. amounted to 1 percent or less. It is to be noted that the distribution of the weights of the molded products may be further reduced by the adoption of other operating conditions than those specified in the foregoing.

It will be realized from the results of the experiments shown in FIG. 4 that the operation of the sensing and controlling units proposed by the present invention is positive and thus applicable to injection molding operation.

As a result of further experiments, it was found that the molded products prepared by the present injection molding machine were free from strain and of higher quality than those prepared by the apparatus hitherto used and that a mold of small diameter gate or so-called pinpoint gate could be used with highly satisfactory results in conjunction with the present injection unit.

According to the present invention, as described above, the filling of the cavity of molds may be sensed positively on the basis of a sudden increase in the time rate of change of the injection pressure, viz, differential thereof ($dP/dT$). Upon filling of the cavity of the molds, the increased oil pressure may be decreased abruptly to a lower pressure such as is necessary to retain the injected material in the mold cavity.

The sensing device operates in a positive manner regardless of the changes in the ambient temperatures or other operating conditions, thus the duration of each shot cycle being considerably reduced. Moreover, the material received into the mold cavity is subjected to a considerably reduced pressure necessary to retain the material in the cavity. Thus, the molded product which is of superior quality and free from strain may be obtained by the present injection molding machine. Further in addition, the metal mold may be simplified in its construction and easy and cheap to manufacture. Also, there is no necessity to provide a separate material-metering device adapted for supplying a measured quantity of the raw material into the feed hopper prior to the molding operation. Furthermore, the present injection molding machine may be used in conjunction with a series of movable metal molds of different capacity arranged circumferentially on a rotary table and, indeed, without the use of the conventional material-metering device.

The drawing thus illustrates an injection molding machine having an injection cylinder 6, 6a, provided with a plunger 5 which is hydraulically operated in a reciprocable movement by the pressure oil at a hydraulic cylinder 3 for injecting a material to be molded into a cavity formed by separable molds 7, and a device C for opening and clamping the separable molds 7; a device 8, 9, sensing the time of fullness of the mold cavity by the material on the basis of a time derivative or rate of change of the pressure of oil in the hydraulic cylinder, viz, the differential ($dP/dT$) in which P represents a pressure of oil working in the hydraulic cylinder and T the corresponding time of injection; and a controlling device 11–18 operated in response to a signal given thereto by the sensing device 8, 9 at the time of filling of the mold cavity for changing the pressure at that time in the hydraulic cylinder 3. The controlling device 11–18 operates in response to the signal given thereto by the sensing device 8, 9 at the time of filling of the mold cavity to change the pressure exerted at that time on the opening and clamping device C of the separable molds to a different degree. Means 22 is further provided for making the sensing device operable only around the time of filling of the mold cavity by the material. A means 23 is also used which delays the transmission of the signal given at 18 to the controlling device at the time of mold filling.

What is claimed is:

1. An injection molding machine comprising:
   a. a separable mold defining a mold cavity in a closed condition of said mold;
   b. a device connected with said mold for opening and clamping same;
   c. an injection cylinder having a chamber adapted to receive a fluent material and communicating with said cavity at least in a closed condition of said mold;
   d. an injection plunger provided in said cylinder for displacing said fluent material into said mold cavity;
   e. a fluid-responsive device including a chamber pressurizable to displace said plunger and drive said material into said mold cavity;
   f. pressure-responsive sensing means connected to at least one of said chambers and provided with differentiating means for producing a voltage responsive to the rate of change of pressure in said one of said chambers; and
   g. control means connected to said sensing means and responsive to said voltage for regulating the operation of at least one of said devices.

2. The injection molding machine defined in claim 1 wherein said sensing means includes a Bourdon tube communicating with said one of said chambers and having a mechanically deflectable free end, and a linear variable differential transformer connected to said free end for producing said voltage.

3. The injection molding machine defined in claim 2 wherein said fluid-responsive device includes a hydraulic cylinder, and a piston received in said hydraulic cylinder and connected to said plunger while defining said one of said chambers in said hydraulic cylinder.

4. The injection molding machine defined in claim 2 wherein said one of said chambers is a chamber of said injection cylinder.

5. The injection-molding machine defined in claim 2 wherein said fluid-responsive device includes a source of fluid pressure operable at a high-pressure level for charging said mold cavity with said material, said control means including means for applying a reduced pressure to said fluid-responsive device for maintaining a predetermined back pressure in said injection cylinder.

6. The injection molding machine defined in claim 2 wherein said one of said devices is said device for opening and clamping said mold.

7. The injection molding machine defined in claim 2, further comprising time delay means in said control means between said sensing means and said one of said devices for delaying the response of said one of said devices upon the generation of said voltage.

8. In an injection molding machine having an injection cylinder, a plunger reciprocable in said injection cylinder, a hydraulic cylinder acting upon said plunger for displacing same in response to an oil pressure, and a separable mold connected with said injection cylinder for receiving material to be molded therein, and said improvement comprising:
   means for converting the pressure in said hydraulic cylinder into an electric signal;
   an electric differentiating circuit connected to said converting means for differentiating said electric signal with respect to time to produce an output signal;
   means connected to said circuit for sensing the magnitude of said output signal and producing a control signal upon said output signal exceeding a predetermined magnitude; and
   means responsive to said control signal for reducing the pressure in said hydraulic cylinder to a low-pressure level immediately upon said output signal exceeding said predetermined magnitude.

9. The improvement defined in claim 8 wherein said sensing means includes means for rendering ineffective any initial output signal exceeding said predetermined magnitude following incipient injection of said material into the mold.

10. The improvement defined in claim 8 wherein said sensing means includes a differentiating circuit provided with a smoothing condenser in parallel to a condenser/resistor network.

11. In an injection molding machine having an injection cylinder, a plunger reciprocable in said injection cylinder, a hydraulic cylinder acting upon said plunger for displacing same in response to an oil pressure, and a separable mold connected with said injection cylinder for receiving material to be molded therein, and said improvement comprising:
   means for converging the pressure in said injection cylinder into an electric signal;
   an electric differentiating circuit connected to said converting means for differentiating said electric signal with respect to time to produce an output signal;
   means connected to said circuit for sensing the magnitude of said output signal and producing a control signal upon said output signal exceeding a predetermined magnitude; and
   means responsive to said control signal for reducing the pressure in said hydraulic cylinder to a low-pressure level immediately upon said output signal exceeding that predetermined magnitude.

12. The improvement defined in claim 11 wherein said sensing means includes means for rendering ineffective any initial output signal exceeding said predetermined magnitude following incipient injection of said material into the mold.

13. The improvement defined in claim 11 wherein said sensing means includes a differentiating circuit provided with a smoothing condenser in parallel to a condenser/resistor network.

* * * * *